United States Patent [19]

Jangaard

[11] Patent Number: 4,588,006
[45] Date of Patent: May 13, 1986

[54] HIGH SPEED HOPPER FED TRIM SAW

[75] Inventor: Erling S. Jangaard, Madeira Beach, Fla.

[73] Assignee: Ruvo Automation Corp., Largo, Fla.

[21] Appl. No.: 709,906

[22] Filed: Mar. 8, 1985

[51] Int. Cl.$^4$ .............................................. B27F 5/12
[52] U.S. Cl. ................. 144/3 R; 144/245 D;
144/245 E; 83/404.2; 83/409.1; 83/417; 83/419
[58] Field of Search ................ 83/404.2, 404, 375,
83/409.1, 414, 417, 418, 419, 428, 437, 452, 581;
144/3 R, 245 D, 245 E

[56] References Cited

U.S. PATENT DOCUMENTS

| | | | |
|---|---|---|---|
| 3,665,982 | 5/1972 | Kvalheim | 83/404.2 |
| 3,838,723 | 10/1974 | Sandberg | 144/245 E |
| 4,246,943 | 1/1981 | Cromeens | 144/245 E |

Primary Examiner—Donald R. Schran
Attorney, Agent, or Firm—Stanley M. Miller

[57] ABSTRACT

A high speed hopper fed trim saw. The saw includes a first cutting station where a miter cut is made in a trim board and a second cutting station where a kerf cut is made in the same board. Boards are discharged one at a time from the hopper onto a stepped base member, and are moved one at a time from the hopper discharge area of the base member to the first cutting station by an indexing mechanism. After the first cut has been made in the first board to leave the hopper discharge area, the indexing mechanism advances the board to the second cutting station and simultaneously delivers a second board to the first cutting station from the hopper discharge area. Subsequent cycles of the machine simultaneously advance the leading board from the second cutting station to a collection area and the following board from the first cutting station to the second cutting station and the board following it from the hopper discharge area to the first cutting station and so on. The steps formed in the base member are provided to cause each board to fall a first time as it enters the first cutting station, and to fall a second time as it enters the second cutting station. At both stations, roller members control the fall to some extent and urge the board in a rearward direction into a corner defined by that station's step to hinder movement of the board during the cutting operation.

16 Claims, 9 Drawing Figures

HIGH SPEED HOPPER FED TRIM SAW

BACKGROUND OF THE INVENTION

1. Field of the Invention

This invention relates, generally, to trim saws, and more particularly relates to a high speed hopper fed trim saw that securely clamps boards to be cut against movement by urging the same into a corner area defined at the base of a step.

2. Description of the Prior Art

Trim boards are often referred to as baseboard moldings, edge moldings, trimming, and the like. These long strips of wood are generally employed to finish buildings by framing or covering certain parts of the structure. They often meet in corners and as a result miter cuts must be made therein. Kerf cuts are needed as well so that the joint where the trimming meets may be reinforced.

A number of machines have been developed to make the needed miter and kerf cuts in trim boards at a high rate of speed. The machines have several shortcomings, however. A typical machine of the prior art, for example, will have an indexing means that moves the boards to be cut, one at a time, from a first miter cutting station to a second kerf cutting station in a manner that is undesireable. Specifically, a typical machine of the prior art will include an indexing means that imparts a forwardly directed force to a trim board to move it to the first cutting station and from there to the second cutting station. Since no two (2) pieces of trimming weigh exactly the same, and since no two (2) pieces of trimming are alike in the amount of warp present therein (it being understood that warp-free trimming is virtually non-existant, all trimming having at least some warp and the amount of warp or other structural imperfections varying between different pieces of trim), the forwardly directed force will cause the individual pieces of trim to travel differing amounts and to turn or twist in different manners in response to such forward motivation.

In other words, since the size, shape and weight of each piece of trim to be cut by a miter and kerf saw is different, the indexing means of the prior art are unacceptable because they do not adapt to the individual characteristics of the boards handled but instead displace all boards forwardly with equal force. This causes light in weight boards to travel less than heavier boards, and causes severly warped boards to arrive at the respective cutting stations in differing positions vis a vis less severely warped boards. Clearly, an indexing means that handles the advancement of all boards as if each board was identical in its features to all other boards is undesireable because the miter and kerf cuts formed therein will vary from board to board. Since it is of the utmost importance to produce interchangeable, standardized boards, the art requires the introduction of a machine that does not have the imprecise indexing means of the prior art. The desired machine would adapt itself to handle each board on an individual basis so that light boards would be advanced by the indexing means the same distance as heavier boards. Warped boards would be securely clamped in a position reproducible to the greatest extent possible so that differing boards would share a uniformity of cut to the highest degree attainable.

The prior art does not include a machine capable of making substantially reproducible miter cuts and kerf cuts in trimming, at high speeds.

SUMMARY OF THE INVENTION

The longstanding but heretofore unfulfilled need for a high speed hopper fed trim saw capable of making uniform cuts is now provided in the form of a machine that has a unique indexing means for advancing the trim boards, one at a time, in a forward direction through the machine. The boards are deposited on a support structure by a hopper member, and are displaced from such starting point by the indexing means to a first cutting station where a miter cut is made therein. A first downward step is formed in the support structure so that the trim drops from the level of the hopper discharge area to the lower level of the miter cutting station as a result of the advancing of the board by the indexing means. The drop is not a free fall to the extent that the leading edge of the board being advanced to the miter cutting station will abut a roller member before the trailing edge of the board clears the step. The roller member is biased in a rearward direction to resist the forward travel of the board, but the positive action of the indexing means will drive the roller backward until the trailing edge of the board has cleared the edge of the step so that the board can fall to the lower level as desired. The indexing means is specifically configured so that it does not interfere in an undesireable manner with the trailing edge of the board as it falls. Its configuration serves to guide the trailing edge of the board into the corner defined by the vertical wall of the step and the level surface of the lower level where the first cutting procedure is performed. Thus, as a board falls from the hopper discharge level of the machine to the miter cut level, it will be temporarily sandwiched between the rearwardly biased roller member and the indexing means, both of which cooperate to guide the board into a position at the foot of the step. The indexing means then returns to its starting position to repeat its two (2) stroke cycle after the miter cut has been performed. As the indexing means retracts, a first supplemental clamping means bears downwardly upon the board to be cut to further hold it against displacement. The board is thus subjected to four (4) converging forces, namely (1) the barrier to downward displacement represented by the level support surface, (2) the barrier to rearward displacement represented by the vertical wall of the step, (3) a resistance to forward motion represented by the rearwardly biased roller member (which force is supplemented by a second supplemental clamping means at the miter cut cutting station only), and (4) a downwardly directed force supplied by the first supplemental clamping means. These forces combine to maintain the board to be cut in its position at the foot of the step throughout the miter cutting procedure.

The following stroke of the indexing means advances the first board to the kerf cutting station which also employs the use of a drop-off step and a rearwardly biased roller member to guide the board into its proper position at the foot of the second step for the kerf cutting operation. The indexing means is constructed so that the advancing of the first board to the second cutting station also serves to simultaneously advance a second board from the hopper discharge area into the miter cutting station. In this manner, each successive stroke of the indexing machine simultaneously advances one (1) board from the hopper discharge area to the first cutting station, the board preceding it to the second cutting station, and the board preceding the last-mentioned board to a machine discharge location.

It should therefore be understood that the indexing means includes three (3) individual indexing members that advance the boards through the machine. The indexing members are longitudinally spaced with respect to one another and are pivotally mounted to an elongate carriage member that reciprocates between a forwardmost position and a rearwardmost position. The pivotal mounting of the indexing members is provided so that the individual members can displace downwardly as the carriage executes its return stroke to avoid marring a trim board that may be rearwardly of the retreating index member.

The stepped support surface has a bifurcated structure in that it is provided in the form of a pair of elongate, parallel base members that are transversely spaced apart with respect to one another by a distance sufficient to accommodate therebetween the indexing members and the carriage member upon which the indexing members are pivotally mounted as aforesaid. The trim boards are deposited on the base members so that the longitudinal axis of the boards is substantially orthogonal to the longitudinal axis of the base members. Thus, the leading edge of a board is a longitudinal edge, as is the trailing edge of a board. The transverse spacing of the base members serves to accommodate the carriage member therebetween as aforesaid and to seat the board to be cut squarely into its position at the foot of the step formed in the support surface. The "step" actually is a pair of steps, one step being formed in each base member but both steps cooperating and serving as a single step.

It is an important object of this invention to provide a machine that can make miter and kerf cuts in trim boards that are substantially uniform as between different boards, and to accomplish such reproducible cuts at a high rate of speed.

A more specific object is to provide a machine that clamps each board in a very firm manner so that the foregoing general object can be achieved.

The invention accordingly comprises the combination of elements, features of construction, and arrangement of parts that will be exemplified in the construction hereinafter set forth, and the scope of the invention will be indicated in the claims.

BRIEF DESCRIPTION OF THE DRAWINGS

For a fuller understanding of the nature and objects of the invention, reference should be made to the following detailed description, taken in connection with the accompanying drawings, in which:

FIG. 4A is an enlarged view of the encircled area designated 4A in FIG. 4;

Similar reference numerals refer to similar parts throughout the several views of the drawings.

DETAILED DESCRIPTION OF THE PREFERRED EMBODIMENT

Figure 1:
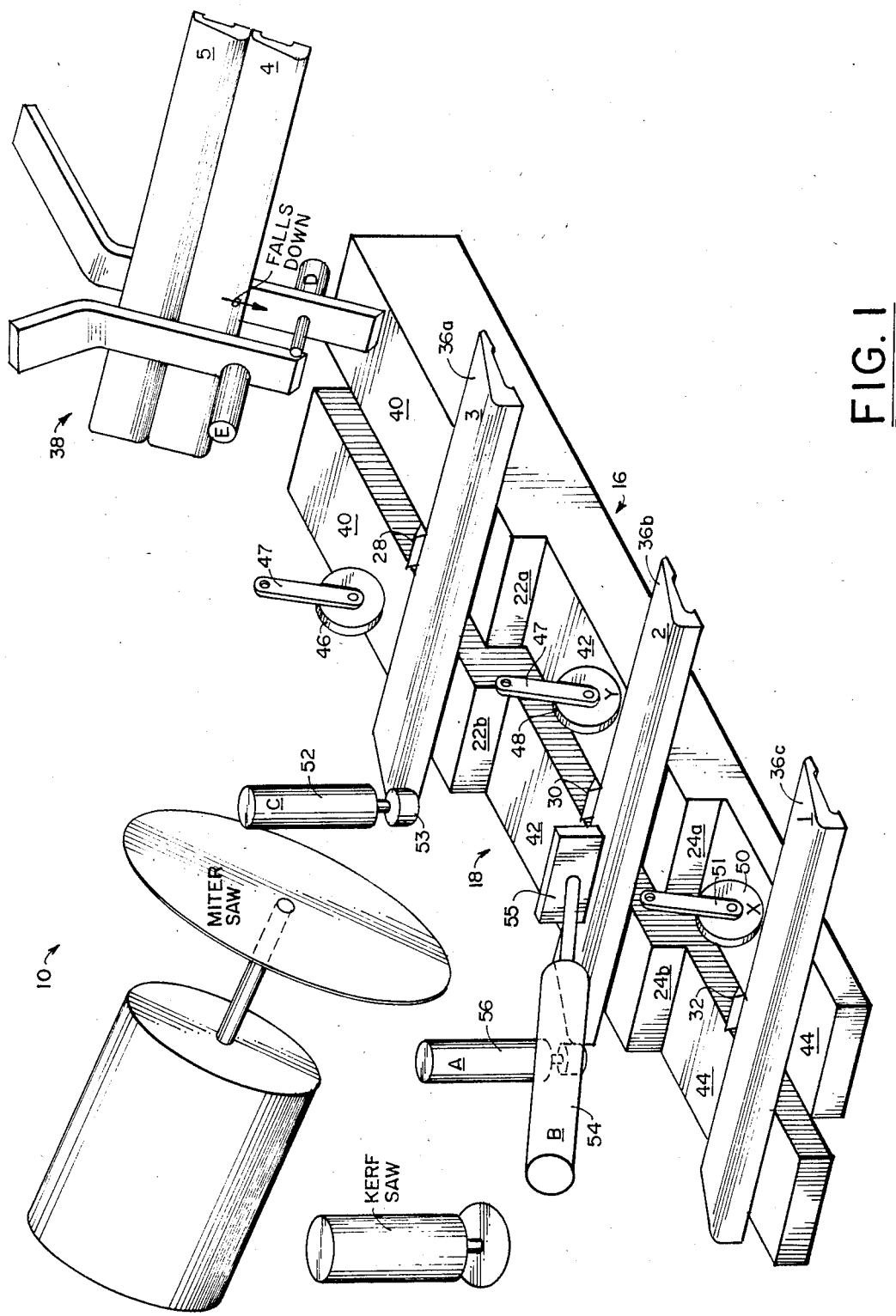
FIG. 1 is a perspective view of a machine that embodies the teachings of this disclosure.

Referring now to FIG. 1, it will there be seen that an embodiment of the subject machine that is illustrative of the teachings of this disclosure is referred to by the reference numeral 10 as a whole.

The machine 10 includes a plurality of upstanding leg members that support a generally rectangular frame means that in turn supports the elements shown in FIG. 1 and the other FIGS., but since the legs and frame means form no part of the invention, per se, the same have been deleted from the FIGS. to simplify the drawings.

As shown in FIG. 1, a pair of elongate base members 16 and 18 are mounted in coplanar, side by side relation to one another. Base members 16, 18 are spaced sufficiently far apart to accommodate between them the indexing means of the machine which is shown in FIGS. 2-6 and generally designated 20.

A first pair of cooperatively positioned step members 22a, 22b are formed in the respective base members 16 and 18 as shown in FIG. 1. A second pair of cooperatively positioned step members 24a, 24b are formed in the base members 16, 18 at a longitudinally spaced position therefrom.

It will be observed that only one of the base members 16, 18, is visible in the side elevational views of FIGS. 2-6, and that only one member of the pair of steps 22a, 22b and 24a, 24b is shown as well in such FIGS.

Figure 2:
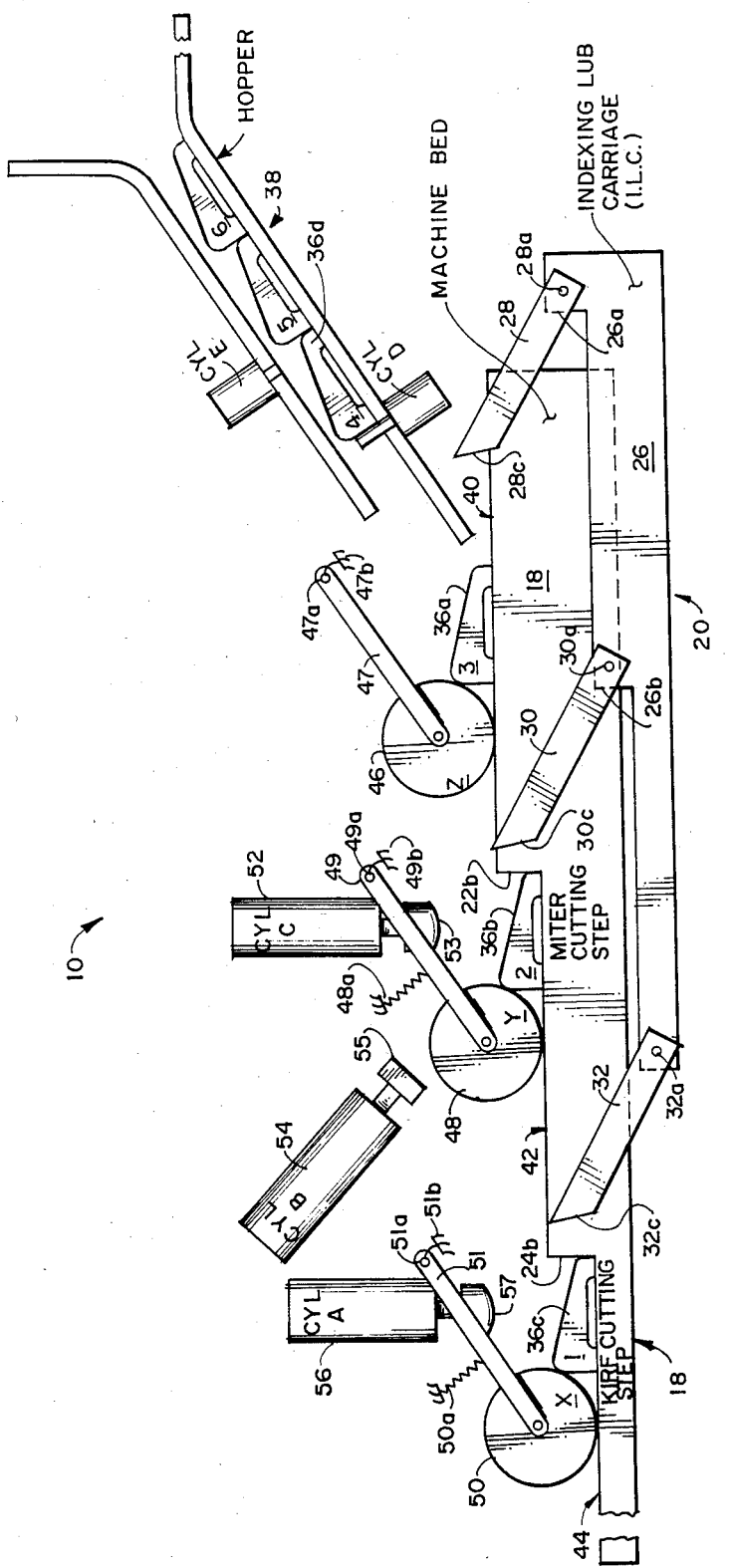
FIG. 2 is a diagrammatic, side elevational view of the machine of FIG. 1 showing the position of its various parts at a stage of the cutting process described hereinafter.

As further indicated in FIG. 2, the indexing means 20 includes an elongate carriage member 26 and three (3) index members 28, 30 and 32 which are pivotally mounted to the carriage member as at 28a, 30a and 32 a, respectively. (The distal free ends of the index members 28, 30 and 32 can be seen in FIG. 1). Although the carriage member 26 could be provided without steps formed therein, in the interest of minimizing the mass of the same it is provided with stepped portions 26a, 26b and 26c. In the preferred embodiment of the invention, each index member 28, 30 and 32 is pivotally mounted adjacent each stepped portion as shown.

Figure 3:
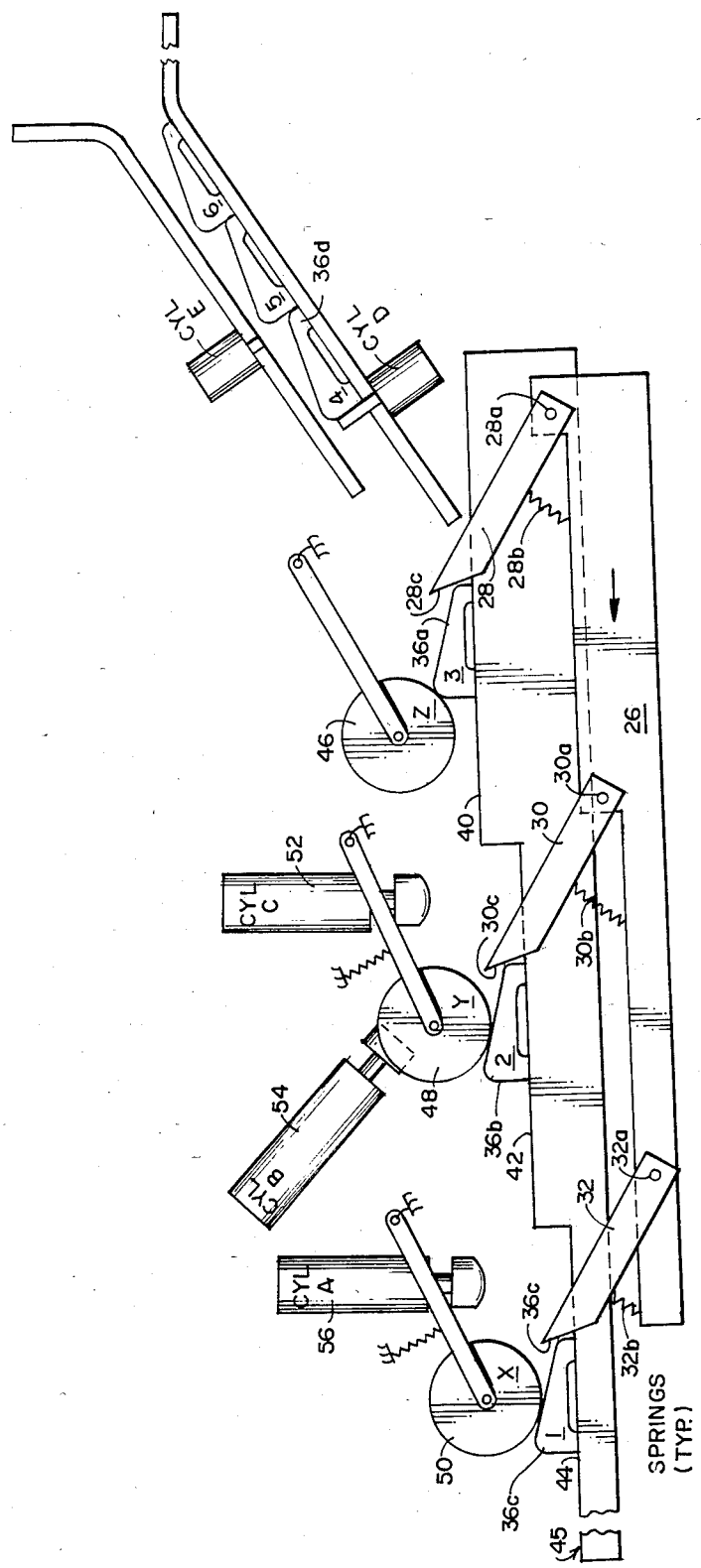
FIG. 3 diagrammatically depicts a stage of the machine operation subsequent to the stage illustrated in FIG. 2.

The index members 28, 30 and 32 are biased so that they project upwardly relative to the horizontal as shown in FIG. 2. (The bias means are shown in FIG. 3 and designated 28b, 30b and 32b). The angle of projection shown is not critical in that the angle depends upon the selected spacing between the base members 16, 18 and the carriage member 26, the vertical drop of the steps 22a, 22b, 24a, 24b, and other physical features of the design which may be selected as desired. However, the respective free ends of the index members 28, 30, 32 must be positioned relative to the base members 16, 18 as shown in the drawings.

A suitable motor means, not shown, is employed to reciprocate the carriage member 26 in the direction indicated in FIG. 2 by the double headed directional arrow 34. Suitable means, not shown, are employed to convert the rotary motion of the motor's output shaft to the desired oscillatory or reciprocable motion. When the carriage 26 moves to the left as indicated by the left-directed portion of arrow 34, the index members 28, 30, 32 carried thereby will also move to the left. This direction of travel will be referred to as the forward direction as this description proceeds and the return stroke of the carriage member 26 will be understood to refer to rearwardly directed travel as indicated by the right-directed portion of arrow 34.

FIG. 2 depicts the machine 10 and three (3) trim boards 36a, 36b and 36c. Board 36c has been provided with a miter cut (not shown) and a kerf cut (not shown) as well. Accordingly, it is ready to be discharged from the machine but the forwardly directed discharge stroke of the carriage member 26 has not yet been initiated at the moment depicted in FIG. 2. Trim board 36b has been provided with a miter cut, and is ready to be advanced to the kerf cutting station occupied by board 36c. Board 36a has been discharged from the hopper 38, and is ready to be advanced to the position occupied by board 36b. Board 36d and the unnumbered boards appearing in FIG. 2 are in the hopper 38 awaiting one at a time discharge therefrom.

The stepped portions 22a, 22b and 24a, 24b formed in base members 16 and 18, respectively, define at least in part the boundaries of the hopper discharge area 40, the miter cut cutting station 42, and the kerf cut cutting station 44. The vertical drops of the steps are uniform so that the hopper discharge area 40 is the same height above the miter cut cutting station 42 as station 42 is above the kerf cut cutting station 44. The subject height is substantially equal to the vertical dimension of the trim boards as is clear from an inspection of the drawings.

The pivotally mounted index members 28, 30, 32 have a height dimension or vertical thickness that substantially corresponds to the vertical drop of the steps and the vertical thickness of the boards, as depicted in the drawings. The respective forwardmost surfaces of the index members are designated 28c, 30c and 32c in FIG. 2, and are cut so that said surfaces are slightly oblique to the vertical walls of the steps. A careful examination of FIG. 2 will reveal that the respective uppermost edges of the surfaces 28c, 30c and 32c are closer to the steps than are the lower most edges thereof. The surfaces 28c, 30c and 32c are thus said to have a slight rearward taper. The purpose of the rearward taper formed in the forwardmost surface of each index member 28, 30, 32 will be disclosed as this description proceeds.

Still referrring to FIG. 2, a first roller member 46 associated with the hopper discharge area 40 is shown rotatably mounted to an arm 47 which in turn is pivotally mounted as at 47a to a suitable support means 47b. In the position shown in FIG. 2, the roller member 46 is abutting the leading edge of trim board 36a, and has accordingly defined the forwardmost position for that trim board as long as boards 36b and 36c are in their respective illustrated positions.

A second roller member 48, associated with the miter cut cutting station 42, is similarly rotatably mounted to arm 49 which is pivotally mounted as at 49a to support surface 49b. It will be noted that the leading edge of board 36b abuts roller member 48 and that the trailing edge of such board abuts the step 22b. A bias member 48a urges roller member 48 downwardly and rearwardly so that board 36b is disposed in sandwiched relation between the step 22b and the roller 48. This arrangement provides a part of the means that hold or clamp the board 36b against displacement during the time the miter cut is being made in such board.

Additional clamping means are provided by cylinder member 52 having a plunger 53 which is disposed upwardly of board 36b. The mounting means for the cylinder has been omitted to simplify the drawing.

Still further clamping means are provided in the form of angularly disposed cylinder 54 having plunger 55. Plunger 55 supplies a clamping force to the board at the miter cut cutting station 42.

A similar arrangement of parts is provided at the kerf cut cutting station 44. The parts perform the same function as the parts described in connection with the miter cut cutting station. The third roller member is designated 50, and its arm is 51 which is pivotally mounted as at 51a to support surface 51b and its bias member 50a urges the arm 51 downwardly and rearwardly. The vertically disposed cylinder of the kerf cut cutting station is designated 56 and its plunger is indicated as at 57. Station 44 does not include a counterpart to the angled clamping means 54 of station 42, but the provision of such a supplemental clamping means at the kerf cut cutting station 44 would be within the contemplation of this invention.

The carriage member 26 is in its fully retracted or rearwardmost position in FIG. 2

FIG. 3 shows the carriage member 26 during its forwardly directed stroke. Each board 36a, 36b and 36c has been abuttingly engaged generally by its associated index member 28, 30, 32, and more specifically has been so engaged by the aforementioned rearwardly tapered forward surfaces 28c, 30c, 32c thereof. Roller members 46, 48 and 50 have been displaced upwardly and forwardly by boards 36a, 36b and 36c, respectively, attendant forward travel of such boards under the urging of the index members 28, 30 and 32, respectively. In FIG. 3, board 36a is being displaced from the hopper discharge area 40 and is approaching the miter cut cutting station 42. Board 36b is approaching the kerf cut cutting station 44, and board 36c is approaching a discharge area, indicated generally as 45.

Figure 4:
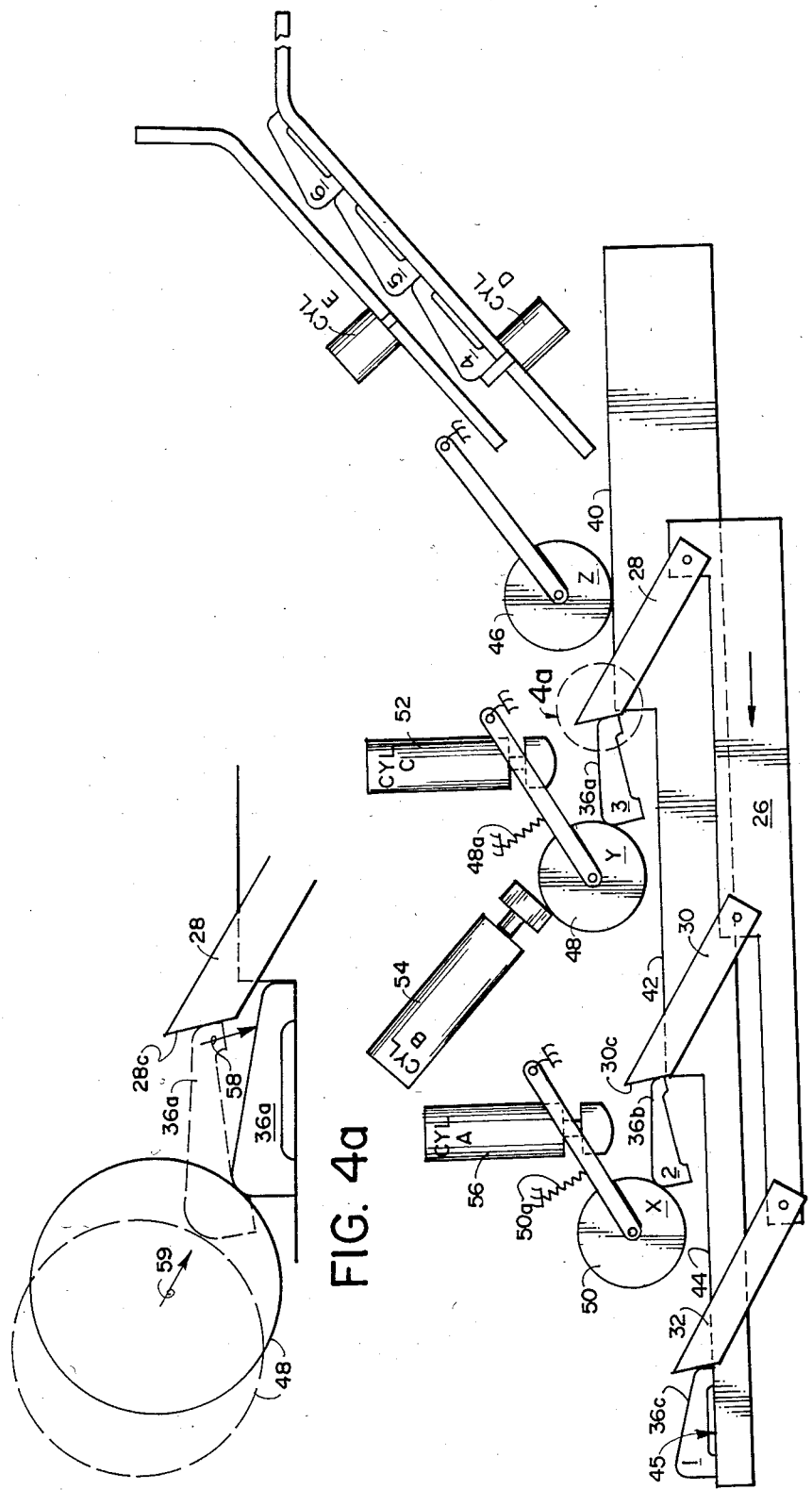
FIG. 4 diagrammatically shows a stage of the machine operation subsequent to the stage illustrated in FIG. 3.

FIG. 4 shows a position of the carriage member 26 and hence of the index members 28, 30 and 32 that is substantilly the forwardmost position thereof. Board 36c has now reached the discharge area 45 and is ready to be picked up by conventional means and shipped. Boards 36a and 36b are shown as they fall, respectively, from the hopper discharge area 40 to the miter cut cutting station 42 and from station 42 to station 44. The fall is not a free fall because the roller members 48 and 50 will have returned to their positions shown in FIG. 2 after the displacement depicted in FIG. 3. Accordingly, the leading edge of each board 36a and 36b will abuttingly engage roller members 48 and 50 to effect the upward and rearward displacement of the same that is illustrated in FIG. 4. Bias members 48a and 50a are thus under compression in FIG. 4, and although displacing rearwardly and upwardly as aforesaid, are maintaining their rearwardly and downwardly directed urgings against their associated trim boards.

Figure 5:
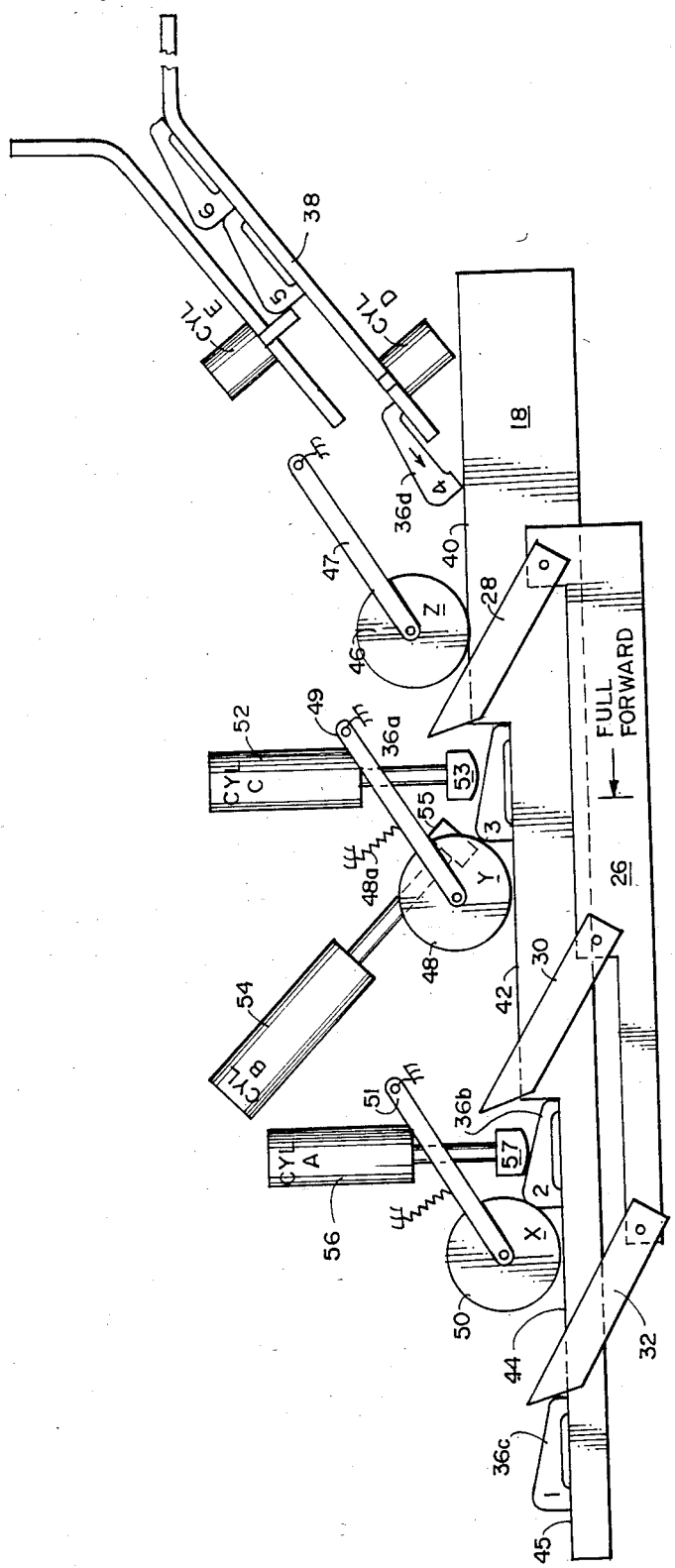
FIG. 5 diagramatically depicts a stage of the machine operation subsequent to the stage illustrated in FIG. 4.

Simultaneously, the rearwardly directed tapers of the forwardmost surfaces 28c, 30c of the index members 28, 30 are directing or guiding the respective trailing edges of the trim boards downwardly so that they will come to rest in the position illustrated in FIG. 5. The downwardly and rearwardly directed action of an index member forwardmost surface is perhaps best understood by making reference to FIG. 4A where a board undergoing a fall is shown in phantom lines and the forces of a roller member and such tapered surface are indicated by the arrows 58, 59.

FIG. 5 shows the boards 36a and 36b at the time the miter cutting operation and kerf cutting operation are being performed, respectively. Plunger 53 of cylinder 52 is now in its lowermost position, as is plunger 55 of cylinder 54. The board at the miter cut cutting station 42 is thus subjected to four (4) converging forces that collectively maintain it against movement during the cutting operation being performed on it. The flat surface of station 42 provides an upwardly directed force which force is opposed by the downwardly directed force of the plunger 53. Similarly, the downwardly and rearwardly directed force of plunger 55 is opposed by the steps 22a, 22b formed in the base members 16,18.

Another trim board, designated 36d, is being deposited by the hopper member 38 onto the hopper discharge area 40 during the time the miter and kerf cuts are being made in boards 36a and 36b, which cuts are made substantially simultaneously.

Figures 6, 7:
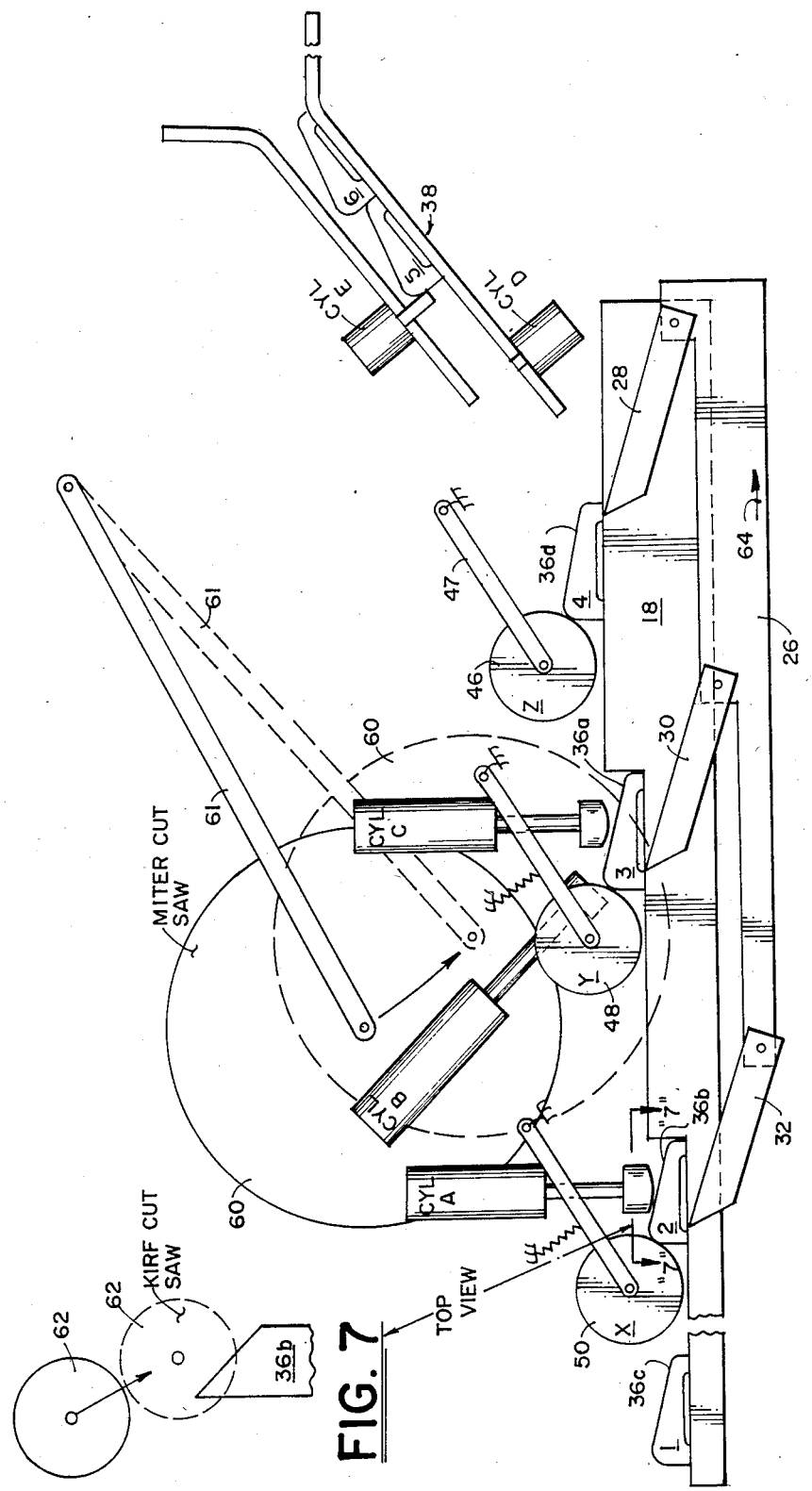
FIG. 6 diagrammatically depicts a stage of the machine operation subsequent to the stage illustrated in FIG. 5.
FIG. 7 is a plan view taken along line 7—7 in FIG. 6.

FIGS. 6 and 7 show in diagrammatic form the miter saw 60 and the kerf saw 62, respectively. The miter saw 60 is rotatably mounted to a swingable arm 61, and the kerf saw 62 is operably mounted to means, not shown, for moving it into and out of cutting relation to a trim board as indicated by the phantom and solid lines of FIG. 7. The miter saw 60 is illustrated as being circular in configuration in FIG. 6, although since the saw is actually disposed at a forty five (45) degree angle relative to the plane of the paper, the circular lines represent a distortion caused by the absence of foreshortening.

The directional arrow 64 in FIG. 6 indicates that the carriage member 26 has begun its return stroke. Upon the completion of the return stroke, the machine will return to the position depicted in FIG. 2 and the cycle described above will repeat itself.

During the return stroke, the index members 28, 30 and 32 will be urged downwardly by the boards as depicted in FIG. 6, i.e., bias members 28b, 30b and 32b (shown only in FIG. 3) will be compressed to allow the full retraction of the carriage member 26.

A commercial embodiment of a machine built in accordance with the teachings of this disclosure is capable of cutting forty (40) boards per minute, a speed that is unattainable by the machines of the prior art. Perhaps even more importantly, the cuts made in the boards are substantially reproducible even though the physical characteristics of the various baords may be different, i.e., even though each individual board fed through the machine may have differing amounts of warp and other characteristics. Thus, boards of poor quality may be cut in a manner comparable to the cuts made in boards of higher quality.

Figure 8:
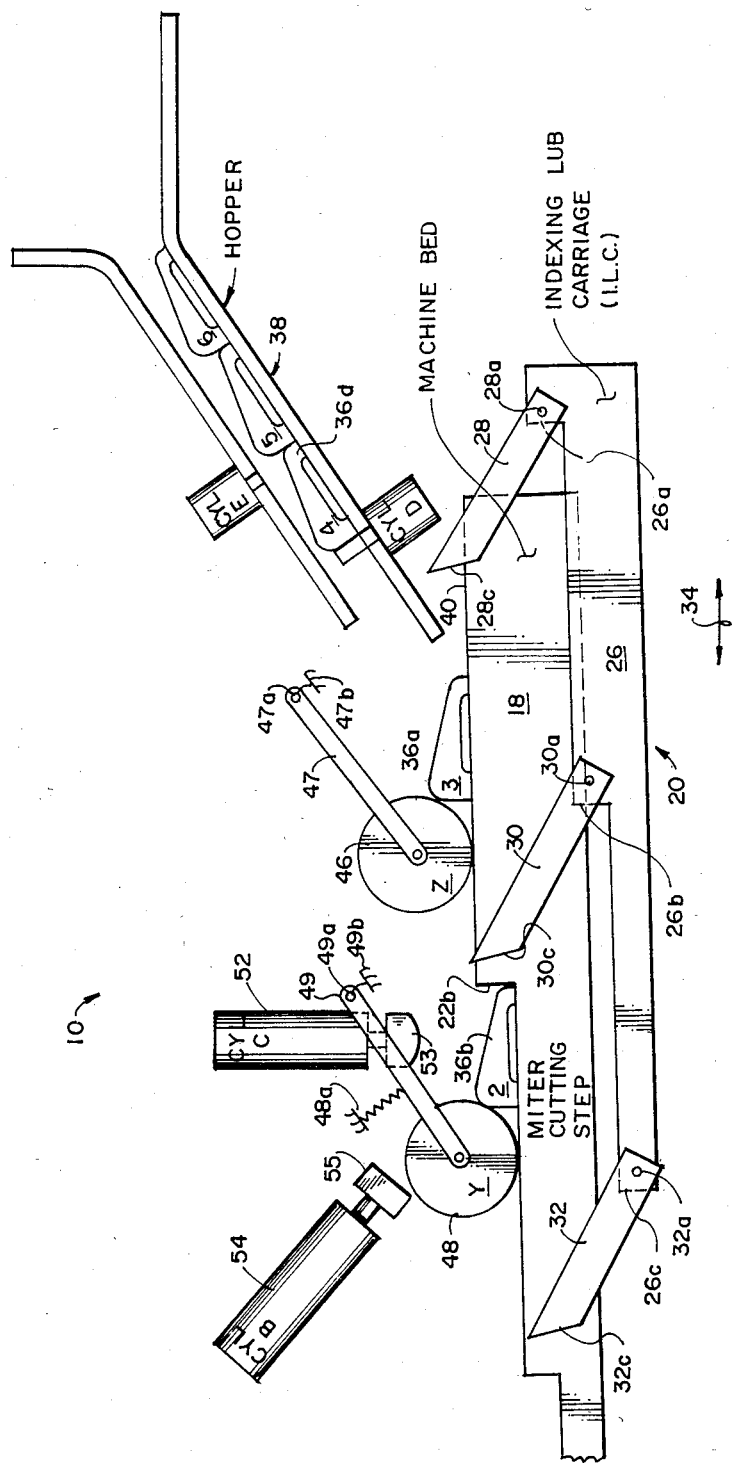
FIG. 8 is a diagrammatic side elevational view of an alternate embodiment having only a miter cutting station.

Other commercial embodiments of the invention provide the miter saw capability only, or the kerf saw capability only, as the customer may require. In these embodiments of the invention, the elongate base members 16 and 18 each have but one (1) step formed therein. Accordingly, such machines have no third level as does the first-described embodiment. The hopper level is retained, but the kerf cut cutting station is eliminated in the miter saw only embodiment and the lower level becomes the kerf cut cutting station in the kerf saw only embodiment. Thus, the FIGS. should be interpreted by those skilled in the art as showing not only the first described embodiment, but these two (2) additional embodiments as well in view of the inclusive nature of the FIGS. The clamping means, positioning means, and indexing means are the same in all embodiments, except for their quantity, of course. FIG. 8 shows the miter only embodiment.

It will thus be seen that the objects set forth above, and those made apparent from the foregoing description, are efficiently attained and since certain changes may be made in the above construction without departing from the scope of the invention, it is intended that all matters contained in the foregoing description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Now that the invention has been described,
What is claimed is:

1. A machine that makes a substantially reproducible miter cut and kerf cut in individual trim boards as a plurality of said boards are presented in rapid succession to the miter cutting and kerf cutting members of the machine, comprising, a pair of stationary, elongate base members disposed in parallel, transversely spaced apart relation to one another in a common horizontal plane, each of said base members having a pair of longitudinally spaced, first and second steps formed therein, said steps formed in said base members cooperatively defining a first bifurcated support surface, a second bifurcated support surface stepped downwardly therefrom, and a third bifurcated support surface spaced downwardly from said second bifurcated support surface, a hopper means for depositing an elongate board to be trimmed onto said first bifurcated support surface such that the longitudinal axis of symmetry of the board is orthogonally disposed with respect to the respective longitudinal axes of symmetry of said base members, an elongate carriage member disposed downwardly and intermediate of said spaced base members, in non-contacting relation thereto, means for linearly reciprocating said carriage member relative to its longitudinal axis of symmetry, a plurality of longitudinally spaced index members carried by said carriage member, said plurality including a first, second and third index member, each of said index members extending upwardly at an angle from said carriage member so that their respective distal free ends are disposed upwardly of the respective horizontal planes defined by the first, second and third bifurcated support surfaces, said first index member, when displaced in a forward direction, abuttingly engaging a first trim board and advancing it forwardly until said board falls under the influence of gravity from said first bifurcated support surface to said second bifurcated support surface, said second index member, when displaced in a forward direction simultaneously with the displacement of said first index member, abuttingly engaging a second trim board and advancing it forwardly until said second board falls under the influence of gravity from said second bifurcated support surface to said third bifurcated support surface, and said third index member, when displaced in a forward direction simultaneously with the displacement of said first and second index members, abuttingly engaging a third trim board and advancing it forwardly relative to said third bifurcated support surface until said carriage member reaches the forwardmost limit of its linear travel.

2. The machine of claim 1, further comprising,
a first trim board clamping means disposed upwardly of said second bifurcated support surface and adapted to reciprocate in a vertical plane,
said first clamping means adapted to apply a downwardly directed force to a trim board disposed atop said second bifurcated support surface.

3. The machine of claim 2, further comprising,
a second trim board clamping means disposed upwardly of said second bifurcated support surface and adapted to reciprocate in a plane that is angularly disposed relative to the horizontal plane of said second bifurcated support surface and specifically positioned and adapted to apply a downwardly and rearwardly directed force to a trim board disposed atop said second bifurcated support surface so that said trim board is pressed into a corner defined by said first step means.

4. The machine of claim 3, further comprising,
a third trim board clamping means disposed upwardly of said third bifurcated support surface and adapted to reciprocate in a vertical plane,
said third clamping means adapted to indirectly apply a downwardly directed force to a trim board disposed atop said third bifurcated support surface.

5. The machine of claim 4, further comprising,
a first trim board positioning means associated with said first bifurcated support surface to properly position individual ones of the trim boards as they are discharged by a hopper means in the aforesaid orthogonal alignment,
said first positioning means provided in the form of a first pivotally mounted roller member biased downwardly and rearwardly into rolling engagement with a preselected one of the base members that forms a part of said first bifurcated support surface,
said first roller member being transiently displaced by a trim board from said rolling engagement with said preselected base member attendant forward travel of said carriage member.

6. The machine of claim 5, further comprising,
a miter saw member associated with said second bifurcated support surface,
a second trim board positioning means associated with said second bifurcated support surface to properly position individual ones of said trim boards prior to cutting thereof by said miter saw member,
said second positioning means provided in the form of a second roller member biased downwardly and rearwardly into rolling engagement with a preselected one of the base members that forms a part of said second bifurcated support surface,
said second roller member disposed in longitudinally spaced relation to said first step by a distance slightly less than the width of a trim board so that the leading edge of a trim board falling from said first bifurcated support surface onto said second bifurcated support surface will abut said second roller member, transiently displace the same attendant forward travel of said carriage member, and subsequently be displaced by and held into a corner defined by said first step by said second roller member attendant rearward travel of said carriage member.

7. The machine of claim 6, further comprising,
a kerf saw member associated with said third bifurcated support surface and disposed in a horizontal plane,
a third trim board positioning means associated with said third bifurcated support surface to properly position individual ones of said trim boards prior to cutting thereof by said kerf saw member,
said third positioning means provided in the form of a third roller member biased downwardly and rearwardly into rolling engagement with a preselected one of the base members that forms a part of said third bifurcated support surface,
said third roller member disposed in longitudinally spaced relation to said second step by a distance slightly less than the width of a trim board.

8. The machine of claim 7, wherein said index members are pivotally mounted to said carriage member at their respective proximal ends and wherein said index members are respectively biased upwardly into trim board-engaging relation so that said index members abuttingly engage said trim boards attendant forward travel of said carriage member and so that said index members are transiently displaced in a downward direction by said trim boards attendant rearward travel of said carriage member.

9. The machine of claim 8, wherein the respective distal free ends of the index members are flat and specifically formed to provide a rearwardly sloping surface slightly oblique to a vertical plane so that the trailing edge of a trim board as it falls from a higher bifurcated support surface to a lower bifurcated support surface is abutted by said rearwardly sloping surface and urged downwardly and rearwardly into a corner defined by a step responsive to the substantially simultaneous urging of said trim board by said rearwardly sloping surface and the particular positioning means associated with the particular step.

10. The machine of claim 9, wherein said carriage member is stepped in a manner similar to the stepping of said base members, and wherein said index members are pivotally mounted to different levels of said stepped carriage member so that the respective lengths of said index members are substantially equal and so that the respective angular dispositions of said respective index members relative to the horizontal plane of said carriage member are substantially equal.

11. The machine of claim 6, wherein said second positioning means includes a bearing surface against which said second clamping means applies its downwardly and rearwardly directed force so that said second trim board is indirectly subjected to the clamping forces of said second clamping means in that said second positioning means only abuts said second trim board.

12. A machine that makes a substantially reproducible miter cut in trim boards as they are presented at high speeds to a cutting member of the machine, comprising, a pair of stationary, elongate base members disposed in parallel, transversely spaced apart relation to one another in a common horizontal plane, a step means formed in each one of said pair of base members such that the step means in each member is laterally aligned with the other step means and such that the step means collectively define a common vertical drop, said step means defining a first or upper surface in each of said base members and a second or lower surface in each of said base members, a hopper member for depositing a trim board on said upper surface in substantially orghogonal disposition relative to the longitudinal axis of said base members, indexing means disposed intermediate said base members for releasably engaging individual ones of said trim boards and advancing them from said upper level to said lower level, a first trim board clamping means positioned above said lower surface and operative to descend into clamping relation to a trim board on said lower surface to firmly hold the same against displacement, and a second trim board clamping means positioned above said lower surface and disposed at an angle relative thereto and operative to advance into clamping relation to a trim board on said lower surface to firmly hold the same in a corner defined by the intersection of said lower surface and said step members.

13. The machine of claim 12, further comprising, a miter saw member rotatably mounted in a vertical plane, angularly disposed relative to said lower surface, and operative to move into and out of cutting relation to a trim board clamped onto said lower surface.

14. The machine of claim 12, further comprising, a kerf saw member rotatably mounted in a horizontal plane and operative to move into and out of cutting relation to a trim board clamped onto said lower surface.

15. The machine of claim 13, further comprising, a trim board positioning means in the form of a roller member biased into rolling engagement with said lower surface and being spaced from said step means by a distance slightly less than the width of a trim board.

16. The machine of claim 14, further comprising, a trim board positioning means in the form of a roller member biased into rolling engagement with said lower surface and being spaced from said step means by a distance slightly less than the width of a trim board.

* * * * *